C. H. DRIVER.
CLAMP CLUTCH DEVICE.
APPLICATION FILED NOV. 15, 1917.

1,281,149.

Patented Oct. 8, 1918.

UNITED STATES PATENT OFFICE.

CHARLES H. DRIVER, OF RACINE, WISCONSIN, ASSIGNOR TO J. MOORES JONES, OF RACINE, WISCONSIN.

CLAMP-CLUTCH DEVICE.

1,281,149.     Specification of Letters Patent.     Patented Oct. 8, 1918.

Application filed November 15, 1917. Serial No. 202,174.

*To all whom it may concern:*

Be it known that I, CHARLES H. DRIVER, a citizen of the United States, and resident of Racine, in the county of Racine and State of Wisconsin, have invented certain new and useful Improvements in Clamp-Clutch Devices; and I do hereby declare that the following is a full, clear, and exact description thereof.

My invention refers to improvements in clamp clutches, particularly that type which is designed to be contained in a drum which forms a portion of a hoisting, elevating, or other form of power transmitting mechanism.

More specifically the invention relates to improved clamp clutch devices for use in connection with power hack saws, such as is disclosed in my co-pending application, Serial No. 177,664, filed June 29, 1917.

It is an object of the present invention to provide a clamp clutch device, which will also serve to change the direction of movement of one form of energy to a different direction. As an exemplification of this, reference is made to the above mentioned co-pending application in which a continuous rotative movement is changed into intermittent rectilinear movement.

An additional object of the invention is to provide a clamp clutch device in the form of a rotative member, which is adapted to be normally rotated in one direction only, but is provided with means for permitting retrograde movement to a predetermined extent.

With these and other important objects in view the invention resides in the novel features of construction, combination and arrangement of parts, which will be hereinafter more particularly described and claimed.

In the accompanying drawing:—

Figure 1 represents a vertical sectional view taken substantially on the plane of the line 1—1 of Fig. 2, certain parts being also broken away to more particularly illustrate the construction of other parts.

Fig. 2 is a vertical, transverse, sectional view taken substantially on the plane of the line 2—2 of Fig. 1, the operating lever being shown in slightly different positions in the two figures.

In the present application the clamp clutch device is not shown in connection with any particular type of machine since it is obvious that it may be readily used in various arts. In other words, the invention is of very general utility, two forms of its application being illustrated in the above mentioned co-pending patent application, which will be seen from Figs. 1 and 3.

Specifically the present clutch device comprises a housing or drum 1, means for rotating the drum, means for actuating the drum rotating means, and an arrangement whereby the energy generated by the rotation of the drum is transmitted to other machinery. The drum includes a rear wall 2 to which is integrally connected an annular flange 3 around which is disposed a cable 4 extending to the load. Although in the present case the clamp clutch is connected to the load by means of a cable or the like, it is obvious that any other suitable connection could be employed therebetween, as for instance the gear teeth shown in patent application, Serial No. 177,664. The drum, which is cylindrical, is disposed on a relatively fixed shaft 5 and is free to rotate thereon, said shaft extending through an opening formed centrally in the rear wall 2.

The end of the drum opposite the wall 2 is adapted to be closed by means of a circular plate or cover 6 whereby to completely house the clutch members disposed within the drum. The outer wall of the cover 6 engages a member 7 which holds the shaft 5 relatively stationary, and this member together with the collar 8 holds the drum and associated parts in operative position on the shaft.

The clutch members are preferably shown constructed so that the drum may be intermittently revolved in one direction without danger of excessive retrograde movement when the means for moving the same in the first mentioned direction is rendered inactive. The clutch means for intermittently engaging the drum for rotation in one direction, such direction in Fig. 1 being counter-clockwise, may be of any preferred construction, but in the present application consists of a pair of gripping shoes 9 operatively connected to a plate 10, and an operating lever 11.

The gripping shoes 9 are arcuate to conform to the curvature of the inner surface of the drum and are preferably disposed in diametrically opposed positions, as shown in Fig. 1. The plate 10 with which they are each connected by a pair of links 12 is formed integrally with the cover 6 to which the lever 11 is also secured. The links 12 have their opposite ends rounded and disposed in seats 13 and 14 formed respectively in the shoes 9 and plate 10, said links thereby being pivotally connected with these other parts.

In Fig. 1 it will be noted that all of the links 12 are disposed slightly at an incline to planes passing diametrically through the center of the shaft 5 or other point concentric to the inner surface of the drum. Such an arrangement allows the shoes 9 to be tightly forced into engagement with the inner surface of the drum when the plate 10 is revolved in a counter-clockwise direction. In other words, although the shoes 9 normally engage the drum, this engagement is not of such character as to cause the drum, the plate 10, and gripping shoes 9 to revolve in unison. It is only when the operating lever 11 is moved in the direction of the arrow that the shoes are tightly bound against the surface of the drum and cause the latter to move therewith. Contractile springs 15 attached by their opposite ends to the shoes 9 and plate 10 prevent the movement of the former by gravitation in the direction of inclination of the links 12.

Since the gripping shoes 9 do not continuously tightly engage the drum 1, means is also provided, as hereinbefore mentioned, for preventing retrograde movement of said drum. The action of this device is similar to that of an ordinary pawl and ratchet mechanism, the drum being the ratchet wheel, and brake shoes 9′ operating in the same manner as the pawl. These shoes 9′ are substantially counterparts of the shoes 9 and also engage the inner surface of the drum 1. Likewise they are connected with a plate 10′ by links 12′, the latter being pivoted to the shoes and plate in the same manner as the first described links.

The plate 10′, however, is splined by means of a key 16 to the shaft 5, and the latter being relatively stationary, it will be seen that the drum will be prevented from moving in a direction reverse to that in which it is moved by the lever 11, or clockwise. Although the links 12′ are also disposed at a slight inclination to the planes passing diametrically through the center of the shaft 5, the action thereof is somewhat different from the links 12. In this instance, inasmuch as the shoes 9′ continuously slightly engage the drum, the movement of said drum in a clockwise direction will tend to drag the shoes 9′ with it and thus decrease the angle of inclination of the links with respect to said diametrical planes. The shoes 9′, therefore, are tightly engaged with the drum and the rotation of the same in a clockwise direction will cease. It is obvious that the tendency of the drum to move in a clockwise direction is occasioned by the action of the load on the cable 4.

Inasmuch as it is necessary in some instances to allow a slight retrograde movement of the drum, means is provided for procuring a slight slippage between the plate 10′ and the shaft 5 to which it is keyed. The most convenient means for obtaining this slippage is by cutting a large keyway 16′ in the plate 10′, the width of this keyway depending upon the amount of return movement desired.

The operation of the device, although it can be probably ascertained from the foregoing description of the various parts of the same, is briefly as follows:—

It will be assumed for convenience in illustration that a weight is attached to the end of the cable 4 and that it is desired to elevate said weight. Such is accomplished by rotation of the drum 1 in a counter-clockwise direction. The motive force for causing the rotation of the drum may be supplied by any suitable machine connected to the operating lever 11 or directly to the plate 10. The provision of the lever allows the drum to be rotated in one direction by a type of energy which is not continuous, as for instance the arrangement shown in Fig. 1 of the hereinbefore mentioned co-pending application in which the lever 41 is the equivalent of the lever 11 in the present case. Stated in a different manner, oscillation of the lever 11 will serve to revolve the drum in a counter-clockwise direction as efficiently as the continuous movement of the lever around the shaft 5.

Upon each movement of the lever 11 in the direction of the arrow shown in Fig. 1, the gripping shoes 9 will be caused to tightly engage the drum to move the same therewith. Upon the return of the lever to its initial position, assuming that the force supplied thereto causes it to oscillate, the brake shoes 9′ will be rendered operative because of the pull in a clockwise direction on the drum and prevent the latter from moving an excessive amount in a reverse direction. As above explained, the drum may be permitted a predetermined retrograde movement, when such is necessary, to properly operate upon the load.

With the foregoing description of the various parts and of the operation thereof, it will be seen that an extremely efficient clamp clutch device has been produced, which may be used in connection with various types of machines. Any changes in the form and proportion of the various parts, for instance in the means for intermittently engaging the drum by the gripping and braking shoes, may be made without departing from or sacrificing any of the principles of the invention as defined by the appended claims.

I claim:—

1. In a clamp clutch device of the class described, a relatively stationary shaft, a drum freely rotatable thereon, means for revolving said drum in one direction, and a detent connected with the shaft for holding the drum against excessive movement in a reverse direction.

2. In a clamp clutch device of the class described, a relatively stationary holding member, a rotatable member freely revoluble with respect thereto, means for revolving said rotatable member in one direction, a plate loosely fixed to said relatively stationary holding member, and a detent carried by the plate for holding the rotatable member against excessive rotation in a reverse direction, limited movement of the rotatable member in said reverse direction being permitted by the loose connection between the relatively stationary holding member and the plate.

3. In a clamp clutch device of the class described, a relatively stationary shaft, a drum freely rotatable thereon, means for revolving said drum in one direction, a plate loosely keyed to said shaft, and a detent carried by said plate for holding the drum against excessive rotation in a reverse direction, limited movement of the drum in said reverse direction being permitted by the loose connection between said plate and shaft.

In testimony that I claim the foregoing I have hereunto set my hand at Milwaukee, in the county of Milwaukee and State of Wisconsin.

CHARLES H. DRIVER.

Copies of this patent may be obtained for five cents each, by addressing the "Commissioner of Patents, Washington, D. C."